United States Patent
Powell et al.

(10) Patent No.: US 8,336,778 B2
(45) Date of Patent: Dec. 25, 2012

(54) GRAPHICAL CODE READERS THAT PROVIDE SEQUENCED ILLUMINATION FOR GLARE REDUCTION

(75) Inventors: George Powell, Sandy, UT (US); Paul Hepworth, Riverton, UT (US); Ryan Hyde, Draper, UT (US); Ryan Hoobler, Salt Lake City, UT (US)

(73) Assignee: The Code Corporation, Bluffdale, UT (US)

( * ) Notice: Subject to any disclaimer, the term of this patent is extended or adjusted under 35 U.S.C. 154(b) by 460 days.

(21) Appl. No.: 12/194,444

(22) Filed: Aug. 19, 2008

(65) Prior Publication Data

US 2010/0044436 A1 Feb. 25, 2010

(51) Int. Cl.
*G06K 7/10* (2006.01)
(52) U.S. Cl. ............... 235/455; 235/462.32; 235/462.41; 235/462.42
(58) Field of Classification Search ............. 235/462.11, 235/462.32, 462.41, 462.42, 435, 454, 455, 235/462.01, 462.06
See application file for complete search history.

(56) References Cited

U.S. PATENT DOCUMENTS

| | | | | |
|---|---|---|---|---|
| 5,597,997 A * | 1/1997 | Obata et al. | ................... | 235/455 |
| 5,920,061 A * | 7/1999 | Feng | ......................... | 235/472.01 |
| 6,000,612 A * | 12/1999 | Xu | ................................ | 235/454 |
| 6,062,475 A * | 5/2000 | Feng | ......................... | 235/462.06 |
| 6,123,263 A * | 9/2000 | Feng | ......................... | 235/462.42 |
| 6,606,171 B1* | 8/2003 | Renk et al. | ..................... | 358/475 |
| 7,028,901 B2* | 4/2006 | Carlson | ..................... | 235/462.04 |
| 7,123,755 B2* | 10/2006 | Shigeta | ......................... | 382/124 |
| 7,128,266 B2* | 10/2006 | Zhu et al. | ................. | 235/462.22 |
| 7,475,822 B2* | 1/2009 | Shiramizu et al. | ....... | 235/462.06 |
| 2003/0147550 A1* | 8/2003 | Shigeta | ......................... | 382/124 |
| 2005/0011956 A1* | 1/2005 | Carlson | ..................... | 235/462.42 |
| 2005/0207655 A1* | 9/2005 | Chopra et al. | ................ | 382/218 |
| 2006/0118629 A1* | 6/2006 | Shiramizu et al. | ............ | 235/454 |
| 2006/0202036 A1* | 9/2006 | Wang et al. | ............. | 235/462.07 |
| 2007/0040035 A1* | 2/2007 | Kotlarsky et al. | ........ | 235/462.45 |
| 2008/0164315 A1* | 7/2008 | Pankow | ................... | 235/462.42 |
| 2009/0084847 A1* | 4/2009 | He et al. | ........................ | 235/455 |

* cited by examiner

*Primary Examiner* — Daniel Hess
*Assistant Examiner* — Paultep Savusdiphol (57) ABSTRACT

A graphical code reader that provides sequenced illumination for glare reduction may include a plurality of light sources that illuminate a target area. The graphical code reader may also include at least one image sensor that captures an image of the target area using a rolling shutter technique. The graphical code reader may also include an illumination controller that sequences illumination of the light sources so that the light sources that are providing the normal component of the illumination to an active portion of the target area are turned off, and so that the light sources that are not providing the normal component of the illumination to the active portion of the target area are turned on.

9 Claims, 8 Drawing Sheets

GRAPHICAL CODE READERS THAT PROVIDE SEQUENCED ILLUMINATION FOR GLARE REDUCTION

TECHNICAL FIELD

The present disclosure relates generally to graphical code readers. More specifically, the present disclosure relates to graphical code readers that provide sequenced illumination for glare reduction.

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, and so forth. Graphical codes and graphical code readers have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. One or more lenses within the graphical code reader focus an image of the graphical code onto an image sensor. Pixels within the image sensor are read electronically to provide a two-dimensional array of image data corresponding to the graphical code. A decoder then processes the image data and extracts the information contained in the graphical code.

The present disclosure relates generally to the reduction of glare in the images that are captured by a graphical code reader.

DETAILED DESCRIPTION

The present disclosure relates generally to the reduction of glare in the images that are captured by a graphical code reader. When capturing images for purposes of reading graphical codes, it is generally desirable to provide evenly distributed, uniform illumination. The term glare is generally used to describe illumination that is uneven and non-uniform, e.g., where there is brighter, more intense illumination in spot regions of the captured images.

The term glare may mean different things in different contexts. For example, glare may refer to the effect of undesirable extraneous reflections that cause the background of an image to increase to a level where the scene of interest is not well-imaged, i.e., so that there is very little contrast. This may occur, for example, when a graphical code reader is used to read a graphical code that is located on a reflective surface.

As another example, glare may refer to the effects of specular reflection (i.e., the mirror-like reflection of light from a surface). A graphical code may be printed with black ink on white paper. When a graphical code reader is held at a certain angle, the black ink may become a mirror, so that the illumination of the black ink appears whiter than the nominally white background paper. This effect, which is the result of specular reflection, will be described herein by the use of the term glare.

The above examples are provided for illustration, and should not be construed as limiting the scope of the present disclosure. As used herein, the term glare should be interpreted broadly to encompass any undesirable effect(s) that may result from extraneous or unwanted reflections of light. The techniques disclosed herein may reduce the effects of glare, as broadly defined above, in the images that are captured by a graphical code reader.

A graphical code reader that provides sequenced illumination for glare reduction is disclosed. The graphical code reader may include a plurality of light sources that illuminate a target area. The graphical code reader may also include at least one image sensor that captures an image of the target area using a rolling shutter technique. The graphical code reader may also include an illumination controller that sequences illumination of the light sources so that the light sources that are providing the normal component of the illumination to an active portion of the target area are turned off, and so that the light sources that are not providing the normal component of the illumination to the active portion of the target area are turned on.

The active portion of the target area may correspond to a presently exposed portion of the at least one image sensor. The light sources may be positioned so that illumination from the light sources is angled toward the target area.

Sequencing the illumination of the light sources may include determining timing information about the operation of the at least one image sensor, determining an illumination sequence based on the timing information, and activating and deactivating the light sources in accordance with the illumination sequence.

A method for providing sequenced illumination for glare reduction is also disclosed. The method may be implemented by a graphical code reader. The method may include illuminating a target area using a plurality of light sources. The method may also include capturing an image of the target area using at least one image sensor. The at least one image sensor may be operated in accordance with a rolling shutter technique. The method may also include sequencing illumination of the light sources so that the light sources that are providing the normal component of the illumination to an active portion of the target area are turned off, and so that the light sources that are not providing the normal component of the illumination to the active portion of the target area are turned on.

A graphical code reader that provides sequenced illumination for glare reduction is also disclosed. The graphical code reader may include means for illuminating a target area using a plurality of light sources. The graphical code reader may also include means for capturing an image of the target area using at least one image sensor. The at least one image sensor may be operated in accordance with a rolling shutter technique. The graphical code reader may also include means for sequencing illumination of the light sources so that the light sources that are providing the normal component of the illumination to an active portion of the target area are turned off, and so that the light sources that are not providing the normal component of the illumination to the active portion of the target area are turned on.

Figure 1:
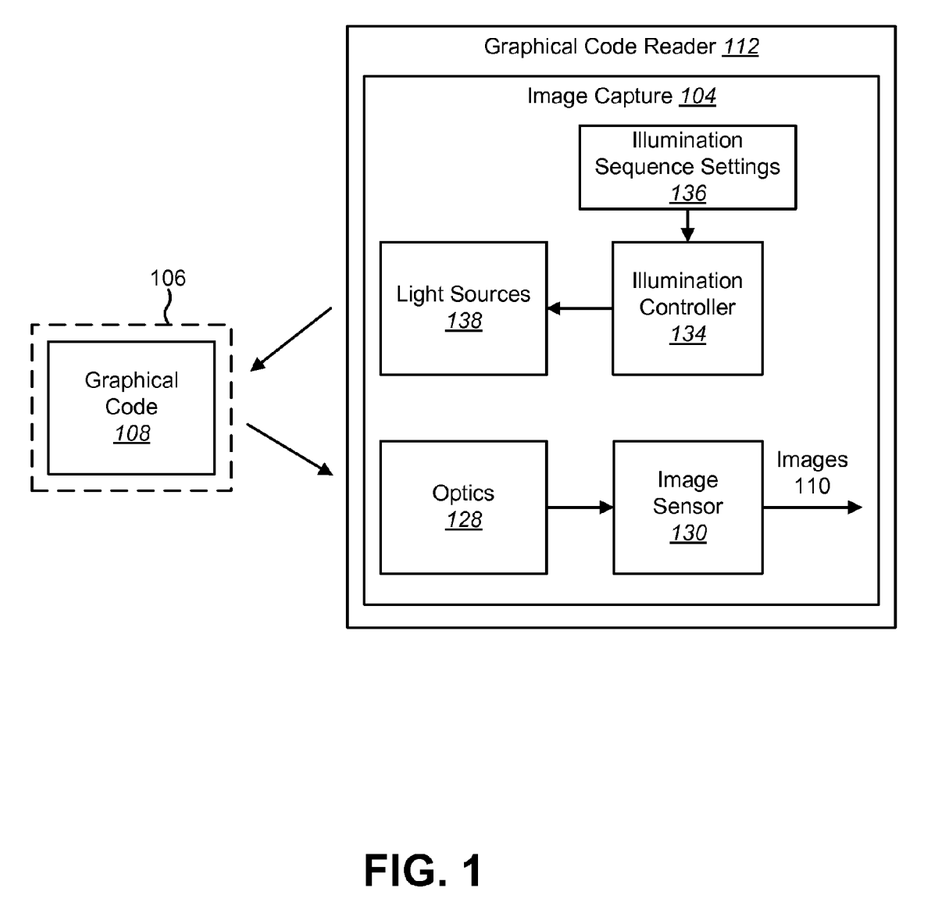
FIG. 1 illustrates an example of a graphical code reader that provides sequenced illumination for glare reduction.

FIG. 1 illustrates an example of a graphical code reader 112 that provides sequenced illumination for glare reduction. The graphical code reader 112 may be an image-based, hand-held graphical code reader 112.

The graphical code reader 112 is shown with various functional components that operate to capture images 110. These functional components may be referred to collectively as an image capture component 104. When the graphical code reader 112 is positioned so that a graphical code 108 is located within a target area 106, one or more images 110 captured by the image capture component 104 may include the graphical code 108.

The image capture component 104 is shown with an illumination controller 134, light sources 138, optics 128, and an image sensor 130. In operation, the illumination controller 134 may activate the light sources 138 to illuminate the target area 106, which in FIG. 1 is shown as including a graphical code 108. Light may be reflected from the graphical code 108 toward the optics 128. The optics 128, which may include one or more lenses, may focus the reflected light onto the image sensor 130.

The image sensor 130 may be a solid state photodetecting device containing a relatively large number of light-sensitive pixels that are arranged in horizontal rows and vertical columns. Read-out circuitry may electronically read the pixels within the image sensor 130 to provide an image 110 (i.e., a two-dimensional array of image data) of the target area 106.

Each captured image 110 may be provided to a decoder (not shown). The decoder may attempt to decode the graphical code 108. The reader 112 may repeatedly capture images 110 until the graphical code 108 is successfully decoded.

The image sensor 130 may capture images 110 in accordance with a rolling shutter technique in which each column (or row) of pixels within the image sensor 130 is exposed in turn, rather than exposing all columns (or rows) simultaneously. In other words, the time light collection starts and ends may be slightly different for each column (or row). As a result, only a portion of the pixels within the image sensor 130 may be exposed at any given time. The image sensor 130 may be, e.g., a complementary metal-oxide-semiconductor (CMOS) device. The rolling shutter technique will be described in greater detail below.

The illumination of the light sources 138 may be sequenced to take advantage of the rolling shutter technique of the image sensor 130, so that the light sources 138 that are providing the normal component of the illumination to the active portion of the target area 106 are turned off, and so that the light sources 138 that are not providing the normal component of the illumination to the active portion of the target area 106 are turned on. (The active portion of the target area 106 refers to the portion of the target area 106 from which light is reflected onto the presently exposed portion of the image sensor 130.)

Because the normal component of the illumination may result in glare, turning off the light sources 138 that are providing the normal component of the illumination to the active portion of the target area 106 may help reduce the effects of glare in the captured images 110. This may allow the graphical code reader 112 to more quickly and more accurately decode graphical codes 108. The light sources 138 that are not providing the normal component of the illumination to the active portion of the target area 106 may remain on, so that there is sufficient illumination to illuminate the active portion of the target area 106.

The controller 134 may access illumination sequence settings 136 to determine how the illumination of the light sources 138 is to be sequenced. The sequencing of light sources 138 will be discussed in greater detail below.

Figure 2:
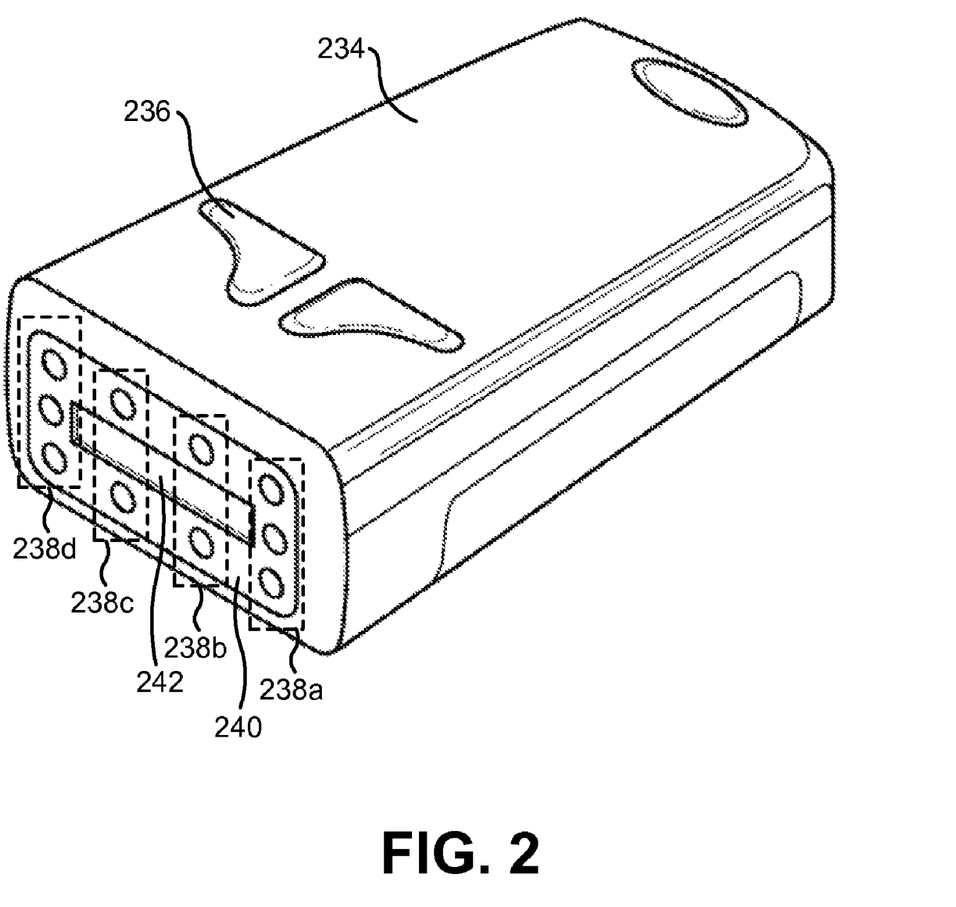
FIG. 2 illustrates an example of a hand-held graphical code reader.

FIG. 2 illustrates an example of a hand-held graphical code reader 212. The graphical code reader 212 includes a housing 234 that surrounds the internal components of the graphical code reader 212. One or more buttons 236 may be included on the graphical code reader 212 for turning on and off various features of the reader 212.

The graphical code reader 212 is shown with a plurality of light sources 238 to provide illumination for a target area 106. More specifically, the graphical code reader 212 is shown with a first set of light sources 238a, a second set of light sources 238b, a third set of light sources 238c, and a fourth set of light sources 238d. The light sources 238a-d may be light-emitting diodes (LEDs). The light sources 238a-d are shown mounted on a front face 240 of the graphical code reader 212.

The graphical code reader 212 shown in FIG. 2 is an image-based graphical code reader 212 that includes an image sensor 130 (not shown in FIG. 2). As indicated above, an image sensor 130 includes a large number of light-sensitive pixels that may be read electronically to provide an image of a target area 106. In the graphical code reader 212 shown in FIG. 2, the image sensor 130 is exposed to the surrounding environment through a window 242 on the front face 240 of the graphical code reader 212. The image sensor 130 may capture images in accordance with a rolling shutter technique, which was briefly described above and which will be described in greater detail below.

The graphical code reader 212 shown in FIG. 2 is provided for purposes of example only. There are many other kinds of graphical code readers to which the present disclosure is applicable. In fact, the methods described herein are applicable to any image-based graphical code reader that uses a rolling shutter technique for image capture.

Figure 3:
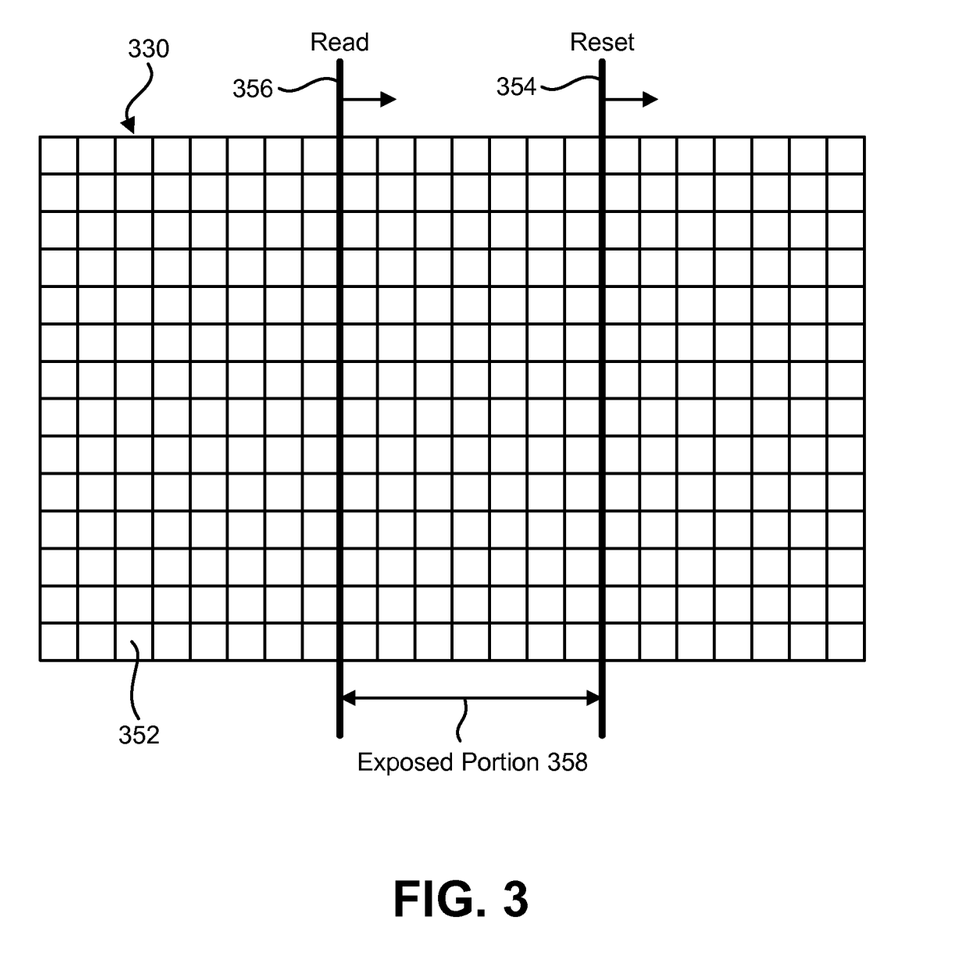
FIG. 3 illustrates an example of an image sensor that captures images in accordance with a rolling shutter technique.

FIG. 3 illustrates an example of an image sensor 330 that captures images 110 in accordance with a rolling shutter technique. The image sensor 330 includes a grid of light-sensitive pixels 352 that are arranged in horizontal rows and vertical columns.

To implement the rolling shutter technique, two different signals may be utilized: a reset signal 354 and a read signal 356. The reset signal 354 may affect all of the pixels 352 in a column and may put the pixels 352 in a state to convert light intensity into an electrical signal. For example, the pixels 352 may be held at ground until the reset signal 354 is applied, after which the pixels 352 may begin to accumulate charge. The read signal 356 may similarly be applied to all of the pixels 352 in a column, and may cause the electrical signals from each pixel 352 in the column to be read electronically.

To capture an image 110, the reset signal 354 may be applied sequentially to each column in the image sensor 330, starting at one side of the image sensor 330 and proceeding column-by-column to the other side of the image sensor 330. At some fixed time interval after this reset process has started, the readout process may begin, i.e., the read signal 356 may be applied sequentially to each column in the image sensor 330. The read signal 356 may be applied in the same fashion and at the same speed as the reset signal 354 was applied.

The "exposure" of a column of pixels 352 refers to the period of time between the column of pixels 352 being reset and the column of pixels 352 being read. The reset and read processes may be timed so that not all of the pixels 352 in the image sensor 330 are exposed at the same time. As shown, the exposed portion 358 of the image sensor 330 includes those pixels 352 that have been reset but not yet read.

Both the reset and read processes have been described as operating on columns of the image sensor 330. Alternatively, however, the image sensor 330 may be configured so that the reset and read processes operate on rows of the image sensor 330. The methods described herein may be used with image sensors that are configured either way.

In fact, the rolling shutter technique is not limited to being applied on a column-by-column (or row-by-row) basis. The rolling shutter technique may involve sequentially applying a reset signal 354 followed by a read signal 356 to a subset of the pixels 352 within the image sensor 430, where the subset of the pixels 352 may be a single column (or row) of pixels 352 as described above, or multiple columns (or rows) of pixels 352.

Figure 4A:
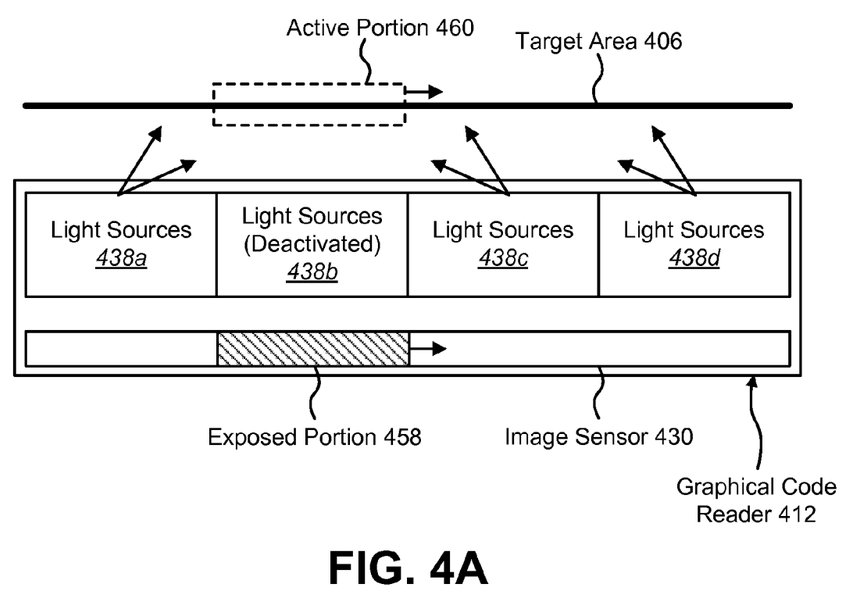
FIGS. 4A through 4C illustrate an example showing how the illumination of light sources may be sequenced for glare reduction in a graphical code reader.
Figure 4B:
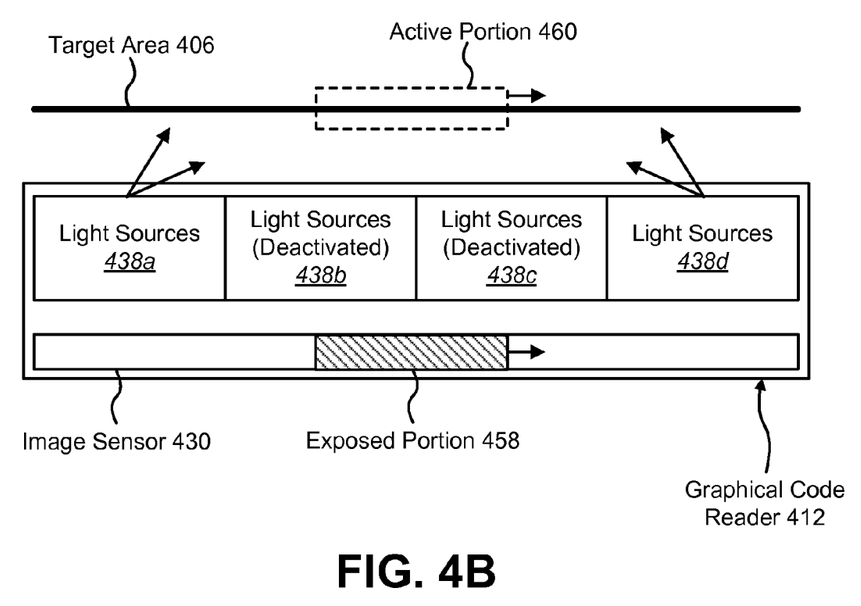
Figure 4C:
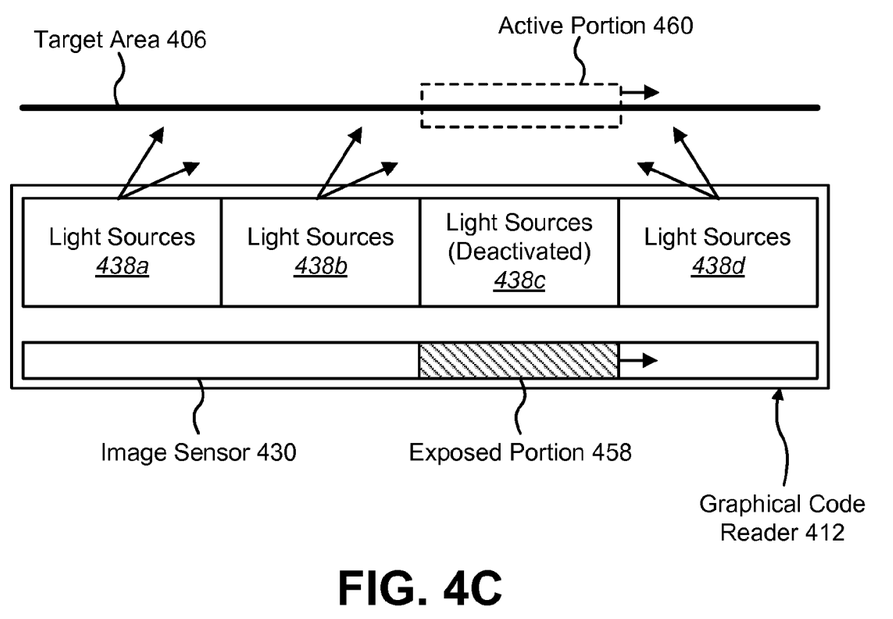

FIGS. 4A through 4C illustrate an example showing how the illumination of light sources 438 may be sequenced for glare reduction in a graphical code reader 412. In these Figures, a graphical code reader 412 is shown being used to capture an image 110 of a target area 406. The target area 406 may include a graphical code 108 (not shown in FIGS. 4A-4C). The view shown in these Figures is a "top-down" view, i.e., the graphical code reader 412 and the target area 406 are shown from above.

The graphical code reader 412 is shown with four different sets of light sources 438a-d. A "set" of light sources 438 may refer to multiple light sources, or to a single light source. The light sources 438 may be positioned on the reader 412 similarly to the way that the light sources 238 are positioned on the reader 212 shown in FIG. 2. As shown in FIGS. 4A-4C, the light sources 438 may be positioned so that illumination from the light sources 438 is angled toward the target area 406.

The illumination of the light sources 438 may be sequenced so that the light sources 438 that are providing the normal component of the illumination to the active portion 460 of the target area 406 are turned off, and so that the light sources 438 that are not providing the normal component of the illumination to the active portion 460 of the target area 406 are turned on. The active portion 460 of the target area 406 is the portion of the target area 406 from which light is reflected onto the presently exposed portion 458 of the image sensor 430.

FIG. 4A shows the graphical code reader 412 at a point in time after image capture has started. The exposed portion 458 of the image sensor 430 is shown positioned so that the second set of light sources 438b would, if they were activated, provide the normal component of the illumination to the active portion 460 of the target area 406. To reduce glare, the second set of light sources 438b may be deactivated (i.e., turned off). The other light sources 438a, 438c, 438d may remain activated (i.e., turned on).

The exposed portion 458 of the image sensor 430 is shown moving to the right. This is because the image sensor 430 operates in accordance with a rolling shutter technique, as discussed above. Because the exposed portion 458 of the image sensor 430 is moving to the right, the active portion 460 of the target area 406 is also moving to the right.

FIG. 4B shows the graphical code reader 412 at a later point in time than FIG. 4A. At this point in time, both the second set of light sources 438b and the third set of light sources 438c would, if they were activated, provide the normal component of the illumination to the active portion 460 of the target area 406. Consequently, to reduce glare, both the second set of light sources 438b and the third set of light sources 438c may be deactivated. The other light sources 438a, 438d, may remain activated.

FIG. 4C shows the graphical code reader 412 at a later point in time than FIG. 4B. At this point in time, the third set of light sources 438c would, if they were activated, provide the normal component of the illumination to the active portion 460 of the target area 406. Consequently, to reduce glare, the third set of light sources 438c may remain deactivated. However, because the second set of light sources 438b is no longer providing the normal component of the illumination to the active portion 460 of the target area 406, these light sources 438b may be reactivated (i.e., turned on again).

The process illustrated in FIGS. 4A through 4C may continue in the manner described above as the exposed portion 458 of the image sensor 430 continues to move to the right until all of the pixels 352 in the image sensor 430 have been exposed and read, and an image 110 has thus been captured. Then, this process may be repeated for each successive image 110 that is captured. The graphical code reader 412 may capture multiple images 110 per second.

Various details are provided in the example of FIGS. 4A through 4C for illustration purposes, but these details should not be construed as limiting the scope of the present disclosure. As another example, the exposed portion 458 of the image sensor 430 may be larger or smaller than what is shown in FIGS. 4A through 4C. Also, there may be more sets of light sources 438 or fewer sets of light sources 438 than what is shown in FIGS. 4A through 4C. Various other details of this example may also be altered in accordance with the present disclosure.

Although there is just one image sensor 430 shown in FIGS. 4A-4C, the graphical code reader 412 may alternatively include multiple image sensors 430. The multiple image sensors 430 may be utilized to capture images 110 of the target area 406 using a rolling shutter technique. The rolling shutter technique may involve sequentially applying a reset signal 354 followed by a read signal 356 to a subset of the total number of pixels 352 within all of the image sensors 430, where the subset of the pixels 352 may be a single column (or row) of pixels 352 as described above, or multiple columns (or rows) of pixels 352. In fact, if the graphical code reader 412 includes multiple image sensors 430, the rolling shutter technique may involve sequentially applying a reset signal 354 followed by a read signal 356 to all of the pixels 352 within an entire image sensor 430.

Figure 5:
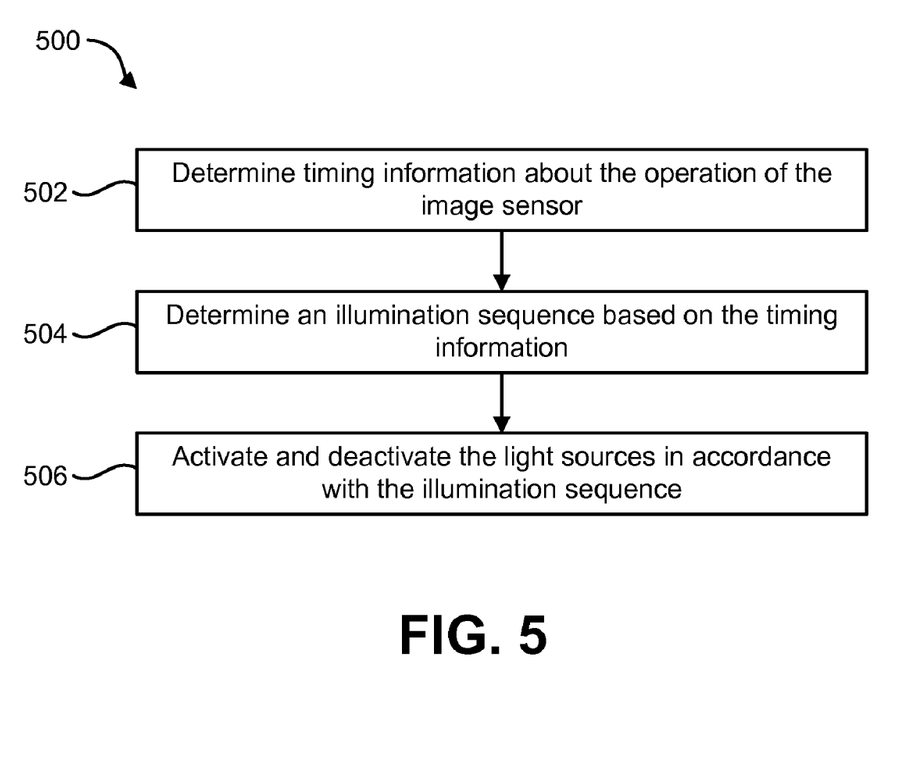
FIG. 5 illustrates an example of a method for using sequenced illumination for glare reduction in a graphical code reader.

FIG. 5 illustrates an example of a method 500 for using sequenced illumination for glare reduction in a graphical code reader 112. The method 500 may be implemented by a graphical code reader 112 that includes an image sensor 130 that operates in accordance with a rolling shutter technique.

In accordance with the method 500, timing information about the operation of the image sensor 130 may be determined 502. For example, the exposure of the pixels 352 of the image sensor 130 may be determined. As indicated above, the exposure of a set of pixels 352 refers to the difference between the time that the pixels 352 are reset and the time that the pixels 352 are read. Another example of timing information that may be determined 502 is the frame rate, i.e., the rate at which images 110 are captured by the graphical code reader 112.

An illumination sequence may be determined 504 based on the timing information that is determined 502 about the operation of the image sensor 130. The illumination sequence may be determined 504 so that the light sources 438 that are providing the normal component of the illumination to the active portion 460 of the target area 406 are turned off, and so that the light sources 438 that are not providing the normal component of the illumination to the active portion 460 of the target area 406 are turned on. When the illumination sequence has been determined 504, the light sources 138 of the graphical code reader 112 may be activated and deactivated 506 in accordance with the illumination sequence.

Figure 6:
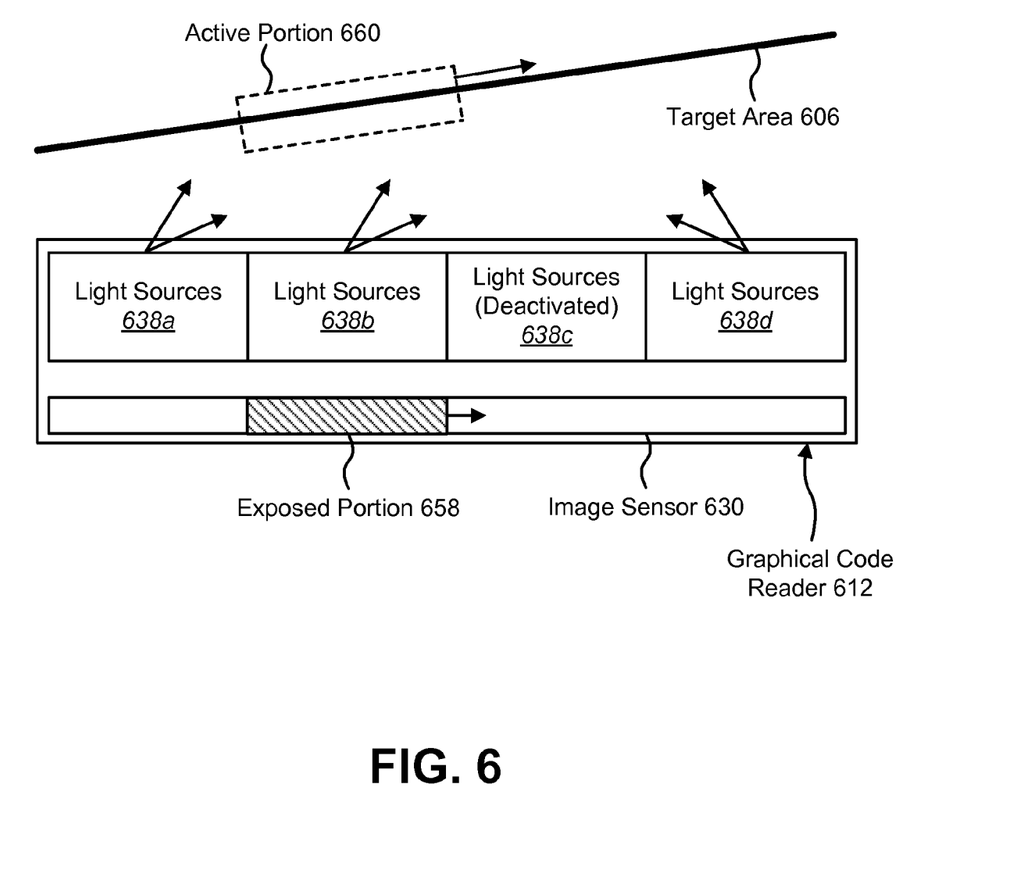
FIG. 6 illustrates another example showing how the illumination of light sources may be sequenced for glare reduction in a graphical code reader.

FIG. 6 illustrates a graphical code reader 612 that is positioned so that the image sensor 630 is angled relative to the target area 606. At the moment of time depicted in FIG. 6, the third set of light sources 638c may be providing the normal component of the illumination to the active portion 660 of the target area 606. Thus, to reduce glare, the third set of light sources 638c may be deactivated (i.e., turned off). The other light sources 638a, 638b, 638d may remain activated (i.e., turned on).

Figure 7:
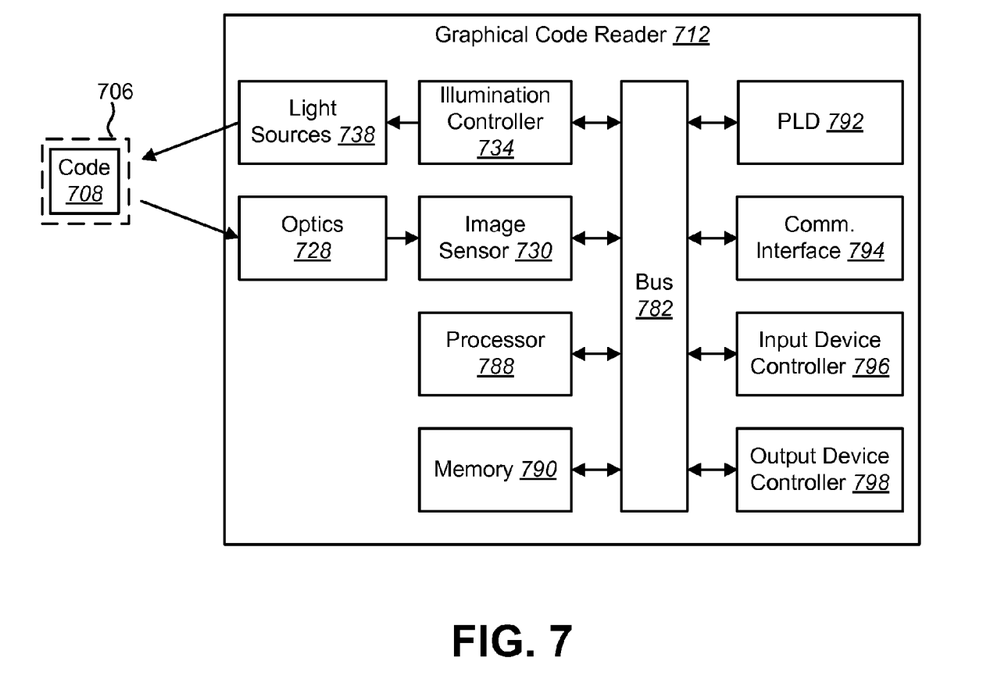
FIG. 7 illustrates components that may be included in a graphical code reader.

FIG. 7 illustrates various components that may be included in a graphical code reader 712. The graphical code reader 712 is shown with a plurality of light sources 738 that may be activated to illuminate a graphical code 708. The light sources 738 may be controlled by an illumination controller 734, which may be in electronic communication with other components in the graphical code reader 712 via a system bus 782.

The graphical code reader 712 may also include optics 728 and an image sensor 730. As discussed above, the image sensor 730 may include a plurality of light-sensitive elements, or pixels 352. The optics 728 may focus light reflected from the target area 706 (i.e., the area that is illuminated by the light sources 738) onto the image sensor 730. A housing (not shown) may be provided for shielding the light-sensitive elements in the image sensor 730 from ambient light. The image sensor 730 may be in electronic communication with other components in the graphical code reader 712 via the system bus 782.

The graphical code reader 712 is also shown with a processor 788 and memory 790. The processor 788 may control various aspects of the operation of the graphical code reader 712 and may be embodied as a microprocessor, a microcontroller, a digital signal processor (DSP), etc. The processor 788 may perform logical and arithmetic operations based on program instructions stored within the memory 790.

As used herein, the term "memory" 790 may be broadly defined as any electronic component capable of storing electronic information, and may be embodied as read only memory (ROM), random access memory (RAM), magnetic disk storage media, optical storage media, flash memory devices in RAM, on-board memory included with the processor 788, EPROM memory, EEPROM memory, registers, etc. The memory 790 may store program instructions and other types of data. The program instructions may be executed by the processor 788 to implement some or all of the methods disclosed herein. The processor 788 and memory 790 may be in electronic communication with other components in the graphical code reader 712 via the system bus 782.

The graphical code reader 712 may also include one or more programmable logic devices (PLDs) 792. The PLDs 792 may be programmed to carry out logic functions that implement, either partially or completely, some or all of the methods disclosed herein. Examples of different types of PLDs 792 that may be used include field-programmable gate arrays (FPGAs), logic-cell arrays (LCAs), programmed arrays of logic (PALs), complex programmable-logic devices (CPLDs), and so forth. The PLDs 792 may be in electronic communication with other components in the graphical code reader 712 via the system bus 782. One or more application-specific integrated circuits (ASICs) may be used in place of or in addition to the PLDs 792.

The graphical code reader 712 is also shown with a communication interface 794 for communicating with other electronic devices. The communication interface 794 may be based on wired communication technology, wireless communication technology, etc. Examples of different types of communication interfaces 794 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interface 794 may be in electronic communication with other components in the graphical code reader 712 via the system bus 782.

The graphical code reader 712 is also shown with an input device controller 796 for controlling input devices, such as keys, buttons, etc. The graphical code reader 712 is also shown with an output device controller 798 for controlling output devices, such as a display screen. The input device controller 796 and output device controller 798 may be in electronic communication with other components in the graphical code reader 712 via the system bus 782.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A graphical code reader that provides sequenced illumination for glare reduction, comprising:
   a plurality of light sources that illuminate a target area;
   at least one image sensor that captures an image of the target area using a rolling shutter technique; and
   an illumination controller that sequences illumination of the light sources so that the light sources that are providing illumination that is normal to an active portion of the target area are turned off, and so that the light sources that are not providing the illumination that is normal to the active portion of the target area are turned on;
   wherein the active portion of the target area is that portion of the target area from which light is reflected onto a presently exposed portion of the image sensor;
   wherein the presently exposed portion of the image sensor is less than the entire image sensor; and
   wherein the active portion of the target area changes over time as the image is captured, so that the light sources that are turned off change over time as the image is captured.

2. The graphical code reader of claim 1, wherein sequencing the illumination of the light sources comprises:
   determining timing information about the operation of the at least one image sensor;
   determining an illumination sequence based on the timing information; and
   activating and deactivating the light sources in accordance with the illumination sequence.

3. The graphical code reader of claim 1, wherein the light sources are positioned so that illumination from the light sources is angled toward the target area.

4. A method for providing sequenced illumination for glare reduction, the method being implemented by a graphical code reader, the method comprising:
   illuminating a target area using a plurality of light sources;
   capturing an image of the target area using at least one image sensor, wherein the at least one image sensor is operated in accordance with a rolling shutter technique; and
   sequencing illumination of the light sources so that the light sources that are providing illumination that is normal to an active portion of the target area are turned off, and so that the light sources that are not providing the illumination that is normal to the active portion of the target area are turned on;
   wherein the active portion of the target area is that portion of the target area from which light is reflected onto a presently exposed portion of the image sensor;
   wherein the presently exposed portion of the image sensor is less than the entire image sensor; and
   wherein the active portion of the target area changes over time as the image is captured, so that the light sources that are turned off change over time as the image is captured.

5. The method of claim 4, wherein sequencing the illumination of the light sources comprises:
   determining timing information about the operation of the at least one image sensor;
   determining an illumination sequence based on the timing information; and
   activating and deactivating the light sources in accordance with the illumination sequence.

6. The method of claim 4, wherein the light sources are positioned so that illumination from the light sources is angled toward the target area.

7. A graphical code reader that provides sequenced illumination for glare reduction, comprising:
   means for illuminating a target area using a plurality of light sources;
   means for capturing an image of the target area using at least one image sensor, wherein the at least one image sensor is operated in accordance with a rolling shutter technique; and
   means for sequencing illumination of the light sources so that the light sources that are providing illumination that is normal to an active portion of the target area are turned off, and so that the light sources that are not providing the illumination that is normal to the active portion of the target area are turned on;
   wherein the active portion of the target area is that portion of the target area from which light is reflected onto a presently exposed portion of the image sensor;
   wherein the presently exposed portion of the image sensor is less than the entire image sensor; and
   wherein the active portion of the target area changes over time as the image is captured, so that the light sources that are turned off change over time as the image is captured.

8. The graphical code reader of claim 7, wherein the means for sequencing the illumination of the light sources comprises:
   means for determining timing information about the operation of the at least one image sensor;
   means for determining an illumination sequence based on the timing information; and
   means for activating and deactivating the light sources in accordance with the illumination sequence.

9. The graphical code reader of claim 7, wherein the light sources are positioned so that illumination from the light sources is angled toward the target area.

* * * * *